(12) United States Patent
Roberts et al.

(10) Patent No.: US 10,348,780 B2
(45) Date of Patent: *Jul. 9, 2019

(54) SYSTEM, METHOD, AND APPARATUS FOR USER-INITIATED PROVISIONING OF A COMMUNICATION DEVICE

(71) Applicant: CenturyLink Intellectual Property LLC, Denver, CO (US)

(72) Inventors: Mike A. Roberts, Spring Hill, KS (US); Shekhar Gupta, Lower Gwynedd, PA (US); Jim Kevin Edwards, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,327

(22) Filed: Feb. 7, 2017

(65) Prior Publication Data

US 2017/0149847 A1  May 25, 2017

Related U.S. Application Data

(63) Continuation of application No. 14/543,685, filed on Nov. 17, 2014, now Pat. No. 9,584,562, which is a
(Continued)

(51) Int. Cl.
*H04L 29/06* (2006.01)
*H04L 12/66* (2006.01)
(Continued)

(52) U.S. Cl.
CPC .......... *H04L 65/1073* (2013.01); *H04L 12/66* (2013.01); *H04L 41/0806* (2013.01); *H04L 67/306* (2013.01)

(58) Field of Classification Search
CPC .................................................. H04L 65/1073
See application file for complete search history.

(56) References Cited

U.S. PATENT DOCUMENTS

| 5,414,697 A | 5/1995 | Osaki |
| 6,345,051 B1 | 2/2002 | Gupta et al. |

(Continued)

OTHER PUBLICATIONS

U.S. Appl. No. 12/250,349; Issue Notification dated Dec. 3, 2014; 1 page.

(Continued)

*Primary Examiner* — Parth Patel

(57) ABSTRACT

An embodiment of a method and apparatus for provisioning of a communication device includes receiving a registration request from a first communication device. The registration request includes an address associated with the first communication device. The method further includes registering the first communication device in response to receiving the registration request, placing a call request to the first communication device, and establishing a call session with the first communication device. The method further includes prompting a user of the first communication device for a user identifier, and receiving a user identifier from the user of the first communication device. The method still further includes sending one or more configuration parameters associated with the user identifier to the first communication device. The one or more configuration parameters are operable to configure the first communication device.

16 Claims, 3 Drawing Sheets

Related U.S. Application Data continuation of application No. 12/250,349, filed on Oct. 13, 2008, now Pat. No. 8,917,718.

(51) Int. Cl.
*H04L 12/24* (2006.01)
*H04L 29/08* (2006.01)

(56) References Cited

U.S. PATENT DOCUMENTS

| | | | |
|---|---|---|---|
| 6,901,425 B1 | 5/2005 | Dykes et al. | |
| 7,079,540 B1 | 7/2006 | Wilson et al. | |
| 7,152,117 B1 | 12/2006 | Stapp et al. | |
| 7,447,632 B2* | 11/2008 | Itou | G10L 17/24 704/246 |
| 7,526,762 B1* | 4/2009 | Astala | G06F 8/33 709/203 |
| 7,580,402 B2 | 8/2009 | Masuhiro et al. | |
| 7,639,696 B2 | 12/2009 | Wu | |
| 7,639,792 B2 | 12/2009 | Qiu et al. | |
| 7,940,773 B2 | 5/2011 | Kerr et al. | |
| 7,948,909 B2 | 5/2011 | Bugenhagen et al. | |
| 7,996,013 B2 | 8/2011 | Hansson et al. | |
| 8,364,746 B2* | 1/2013 | Annamalai | H04W 4/02 455/404.2 |
| 8,527,980 B2* | 9/2013 | Stich | G06F 8/65 717/172 |
| 8,917,718 B2* | 12/2014 | Roberts | H04L 65/1073 370/241 |
| 9,584,562 B2 | 2/2017 | Roberts et al. | |
| 2001/0030977 A1 | 10/2001 | May | |
| 2002/0003789 A1 | 1/2002 | Kim et al. | |
| 2002/0075845 A1 | 6/2002 | Mullaney et al. | |
| 2002/0085577 A1 | 7/2002 | Kim | |
| 2002/0110121 A1 | 8/2002 | Mishra | |
| 2002/0163447 A1 | 11/2002 | Runyon | |
| 2002/0193989 A1 | 12/2002 | Geilhufe et al. | |
| 2003/0110371 A1 | 6/2003 | Yang et al. | |
| 2003/0194078 A1 | 10/2003 | Wood et al. | |
| 2003/0206546 A1* | 11/2003 | Beyda | G06F 9/4403 370/352 |
| 2004/0119894 A1 | 6/2004 | Higgins et al. | |
| 2004/0141461 A1 | 7/2004 | Zimmer et al. | |
| 2004/0230695 A1 | 11/2004 | Anschutz et al. | |
| 2005/0013301 A1 | 1/2005 | Bouchat et al. | |
| 2005/0204162 A1 | 9/2005 | Rayes et al. | |
| 2005/0226215 A1 | 10/2005 | Delregno et al. | |
| 2006/0020460 A1 | 1/2006 | Itou | |
| 2006/0101028 A1* | 5/2006 | Banks | G06F 21/62 |
| 2006/0159008 A1 | 7/2006 | Sridhar et al. | |
| 2006/0165086 A1 | 7/2006 | Wilson et al. | |
| 2006/0168167 A1 | 7/2006 | Kushalnagar et al. | |
| 2006/0218624 A1* | 9/2006 | Ravikumar | H04L 63/102 726/3 |
| 2006/0239183 A1* | 10/2006 | Robitaille | G06F 1/266 370/217 |
| 2006/0245435 A1 | 11/2006 | Sajassi | |
| 2006/0245439 A1 | 11/2006 | Sajassi | |
| 2007/0036358 A1 | 2/2007 | Nguyen et al. | |
| 2007/0076607 A1 | 4/2007 | Volt et al. | |
| 2007/0153799 A1 | 4/2007 | Sorrini et al. | |
| 2007/0123288 A1* | 5/2007 | Hofbauer | H04M 3/42 455/518 |
| 2007/0147356 A1 | 6/2007 | Malas | |
| 2007/0167175 A1 | 7/2007 | Wong et al. | |
| 2007/0171912 A1 | 7/2007 | Mitsumori | |
| 2007/0177548 A1 | 8/2007 | Oyama et al. | |
| 2007/0204330 A1 | 8/2007 | Townsley et al. | |
| 2007/0206582 A1* | 9/2007 | Kuncoro | H04L 12/6418 370/356 |
| 2007/0220596 A1 | 9/2007 | Keeler et al. | |
| 2007/0258456 A1 | 11/2007 | Khouderchah et al. | |
| 2007/0280267 A1 | 12/2007 | Ould-Brahim | |
| 2007/0286207 A1 | 12/2007 | Almalki et al. | |
| 2007/0299987 A1 | 12/2007 | Parker et al. | |
| 2008/0034068 A1* | 2/2008 | Vaughan | G06Q 10/06 709/220 |
| 2008/0046873 A1 | 2/2008 | Rumsey | |
| 2008/0049623 A1 | 2/2008 | Qiu et al. | |
| 2008/0075261 A1* | 3/2008 | Ramanathan | H04L 65/1006 379/220.01 |
| 2008/0098006 A1 | 4/2008 | Pedersen et al. | |
| 2008/0120694 A1* | 5/2008 | Pandey | H04L 12/66 726/2 |
| 2008/0130628 A1 | 6/2008 | Lin et al. | |
| 2008/0151906 A1 | 6/2008 | Kolli et al. | |
| 2008/0207181 A1* | 8/2008 | Jiang | H04W 4/14 455/414.1 |
| 2008/0293408 A1 | 11/2008 | Jiang | |
| 2008/0314973 A1 | 12/2008 | Zuhars | |
| 2009/0016517 A1 | 1/2009 | Emmanuel | |
| 2009/0028315 A1 | 1/2009 | Tovino | |
| 2009/0067437 A1 | 3/2009 | Krishnan | |
| 2009/0109845 A1 | 4/2009 | Andreasen | |
| 2009/0168756 A1* | 7/2009 | Kurapati | H04L 63/08 370/352 |
| 2009/0185564 A1 | 7/2009 | Kerr et al. | |
| 2009/0217317 A1* | 8/2009 | White | G06Q 30/02 725/32 |
| 2010/0091762 A1 | 4/2010 | Roberts et al. | |
| 2010/0142445 A1 | 6/2010 | Schlicht | |
| 2010/0144313 A1 | 6/2010 | Chun | |
| 2010/0217837 A1* | 8/2010 | Ansari | G06Q 30/04 709/218 |
| 2012/0331524 A1 | 12/2012 | Mower | |
| 2015/0078373 A1 | 3/2015 | Roberts et al. | |

OTHER PUBLICATIONS

U.S. Appl. No. 12/009,384; Non-Final Rejection dated Sep. 15, 2009; 25 pages.

U.S. Appl. No. 12/009,384; Final Rejection dated Jan. 29, 2010; 24 pages.

U.S. Appl. No. 12/009,384; Non-Final Rejection dated Apr. 29, 2010; 25 pages.

U.S. Appl. No. 12/009,384; Non-Final Rejection dated Sep. 1, 2010; 24 pages.

U.S. Appl. No. 12/009,384; Notice of Allowance dated Feb. 8, 2011; 17 pages.

U.S. Appl. No. 12/009,384; Issue Notification dated Apr. 20, 2011; 1 page.

U.S. Appl. No. 12/250,349; Non-Final Rejection dated Mar. 15, 2012; 35 pages.

U.S. Appl. No. 12/250,349; Final Rejection dated Jul. 19, 2012; 44 pages.

U.S. Appl. No. 12/250,349; Non-Final Rejection dated Sep. 25, 2012; 49 pages.

U.S. Appl. No. 12/250,349; Final Rejection dated Dec. 20, 2012; 50 pages.

U.S. Appl. No. 12/250,349; Non-Final Rejection dated Jul. 31, 2013; 26 pages.

U.S. Appl. No. 12/250,349; Final Rejection dated Dec. 17, 2013; 24 pages.

U.S. Appl. No. 12/250,349; Non-Final Rejection dated Apr. 8, 2014; 33 pages.

U.S. Appl. No. 12/250,349; Notice of Allowance dated Aug. 15, 2014; 28 pages.

U.S. Appl. No. 14/543,685; Non-Final Rejection dated Jun. 24, 2015; 42 pages.

U.S. Appl. No. 14/543,685; Final Rejection dated Oct. 27, 2015; 35 pages.

An Chan, VoIP over Multiple IEEE 802.11 Wireless Lans; 2007; IEEE.

U.S. Appl. No. 14/543,685; Non-Final Rejection dated Mar. 2, 2016; 37 pages.

U.S. Appl. No. 14/543,685; Final Rejection dated Jun. 27, 2016; 38 pages.

(56) References Cited

OTHER PUBLICATIONS

U.S. Appl. No. 14/543,685; Notice of Allowance dated Oct. 18, 2016; 21 pages.
U.S. Appl. No. 14/543,685; Issue Notification dated Feb. 8, 2017; 1 page.

* cited by examiner

SYSTEM, METHOD, AND APPARATUS FOR USER-INITIATED PROVISIONING OF A COMMUNICATION DEVICE

CROSS REFERENCE TO RELATED APPLICATIONS

This application is a continuation of U.S. patent application Ser. No. 14/543,685 filed Nov. 17, 2014 by Mike A. Roberts et al. and titled, "System, Method, and Apparatus for User-Initiated Provisioning of a Communication Device", which is a continuation of U.S. patent application Ser. No. 12/250,349 (now U.S. Pat. No. 8,917,718), filed Oct. 13, 2008 by Mike A. Roberts et al. and titled, "System, Method, and Apparatus for User-Initiated Provisioning of a Communication Device", the entire teachings of which are incorporated herein by reference in its entirety.

BACKGROUND

In today's voice over IP (VoIP) environment, provisioning of VoIP phones is typically a "high touch" process. Typically, a truck rolls and or an on-site technician must be sent to a customer's premises in order that the VoIP phone may be installed and configured by the on-site technician so that the VoIP phone may provide the particular services desired by a user. The VoIP phone must then be provisioned at a feature server before the VoIP phone may operate on a communication network or use the features provided by a feature server. This requirement for truck rolls and on-site technicians makes the provisioning process both costly and time consuming.

BRIEF SUMMARY

An embodiment of a method for provisioning of a communication device includes receiving a registration request from a first communication device. The registration request includes an address associated with the first communication device. The method further includes registering the first communication device in response to receiving the registration request, placing a call request to the first communication device, and establishing a call session with the first communication device. The method further includes prompting a user of the first communication device for a user identifier, and receiving a user identifier from the user of the first communication device. The method still further includes sending one or more configuration parameters associated with the user identifier to the first communication device. The one or more configuration parameters are operable to configure the first communication device.

An embodiment of an apparatus for provisioning of a communication device includes a memory and at least one processor. The at least one processor is configured to retrieve computer readable instructions from the memory and execute the computer readable instruction so as to receive a registration request from a first communication device. The registration request includes an address associated with the first communication device. The at least one processor is further configured to register the first communication device in response to receiving the registration request, and receive a user identifier from the first communication device. The at least one processor is further configured to send one or more configuration parameters associated with the user identifier to the first communication device. The one or more configuration parameters are operable to configure the first communication device.

An embodiment of a method for user-initiated provisioning a communication device includes sending a registration request to a feature server. The registration request includes an address associated with a first communication device. The method further includes receiving a call request from the feature server in response to sending the registration request, and establishing a call session with the feature server. The method further includes receiving a prompt from the feature server for a user to provide a user identifier, receiving a user identifier from the user, and sending the user identifier to the feature server. The method further includes receiving one or more configuration parameters associated with the user identifier. The one or more configuration parameters are operable to configure the first communication device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
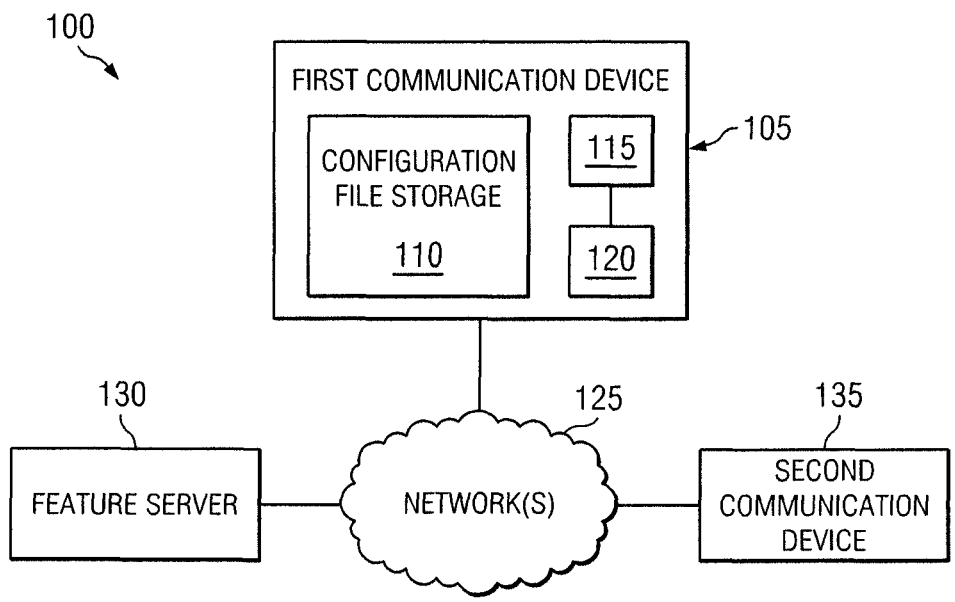
FIG. 1 is an embodiment of a system for user-initiated provisioning of a communication device by a feature server.

FIG. 1 is an embodiment of a system 100 for user-initiated provisioning of a communication device by a feature server. System 100 includes a first communication device 105 and a second communication device 135 in communication with a feature server 130 over a network 125.

In various embodiments, the first communication device 105 is a packet-based telephony network phone. In a particular embodiment, the first communication device 105 is a VoIP phone. In still other embodiments, the first communication device 105 may include a cell phone, a wireless phone, a software phone, or any other communication device. The first communication device 105 includes a configuration file storage 110, a processor 115 and a memory 120. The configuration file storage 110 is configured to store one or more configuration files for use in configuring the first communication device 105. The configuration files include configuration information and configuration parameters for the first communication device 105. For example, the configuration parameters may include configuration information required to support calling features available for the first communication device 105. The processor 115 is configured to retrieve computer readable instructions from the memory 120 and execute the computer readable instructions to perform the various functions of the first communication device 105, described herein. In various embodiments, the first communication device 105 is configured to initiate and receive requests to establish communication sessions with one or more other communication devices. In particular embodiments, the communication sessions include a voice calling session.

In various embodiments, the network(s) 125 is one or more of a wireless network, a wired network, a packet switched network, an asynchronous transfer mode (ATM) network, a public switched telephone network (PSTN), and any other communication network.

In various embodiments, the feature server 130 is configured to provide calling features and other desired phone features to the first communication device 105, as well as provision the first communication device 105 for operation with the network(s) 125. Examples of call features that may be provided to the first communication device 105 by the feature server 130 include calling forwarding, selective call forwarding, selective call acceptance, selective call rejection, call blocking, conference calling, call directories, 911 services, and voice mail services. A particular embodiment of the feature server 130 is further described with respect to FIG. 2.

In various embodiments, the second communication device 135 may include a telephone, a mobile phone, or any other communication device. Upon provisioning of the first communication device 105, a user or the first communication device 105 may send or receive call requests to and from the second communication device 135, and use calling features provided by the feature server 130.

Figure 2:
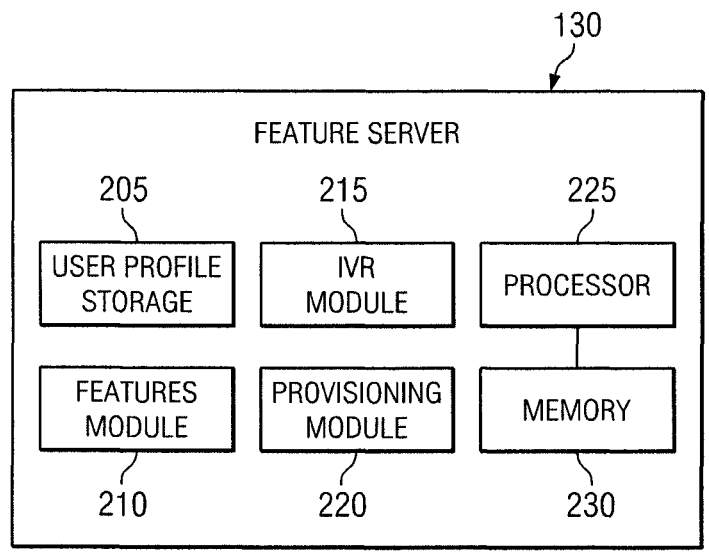
FIG. 2 is an embodiment of the feature server of FIG. 1.

FIG. 2 is an embodiment of the feature server 130 of FIG. 1. The feature server 130 includes a user profile storage 205, a features module 210, an IVR module 215, a provisioning module 220, a processor 225, and a memory 230.

The user profile storage 205 is configured to store one or more user profiles associated with one or more users or customers that are to use calling features or services provided by the feature server 130. In various embodiments, each user profile is associated with a particular communication device in communication with the network(s) 125, for example, the first communication device 105. In a particular embodiment, a particular user profile includes a user identifier associated with the first communication device 105, an address associated with the first communication device 105, and a configuration file associated with the user identifier. In at least one embodiment, the configuration file includes configuration parameters for configuring the first communication device 105 for operation with the network(s) 125, and for operation with any features and/or services provided by the feature server 130 to which the user is authorized.

The features module 210 is configured to provide one or more calling features and service to communication devices registered with the feature server 130. In a particular embodiment, the features module 210 is configured to provide one or more calling features and/or services to the first communication device 105 that are authorized.

The IVR module 215 is configured to receive a voice input from a user of the first communication device 105, process the voice input, and perform a desired function or functions in response to the voice input. In a particular embodiment, the IVR module 215 may receive a user identifier spoken by the user of the first communication device 105. The feature server 130 may then match the user identifier to a corresponding user profile for use in configuring and provisioning the first communication device 105.

The provisioning module 220 is configured to provision the first communication device 105 for operation with the feature server 130 and the network(s) 125. In a particular embodiment, the provisioning module 220 is configured to receive an address associated with the first communication device 105, for example, a media access control (MAC) address, and populate a provisioning table with the received address. In various embodiments, the provisioning module 220 is operable to receive a user identifier associated with the first communication device 105 from a user of the first communication device, and send a configuration file associated with the user identifier to the first communication device 105 in response to receiving the user identifier.

As described, the feature server 130 further includes a processor 225 and a memory 230. In various embodiments, the processor 225 is configured to retrieve computer readable instructions from the memory 230 and execute the computer readable instructions to perform the various functions of the feature server 130 described herein.

Figure 3:
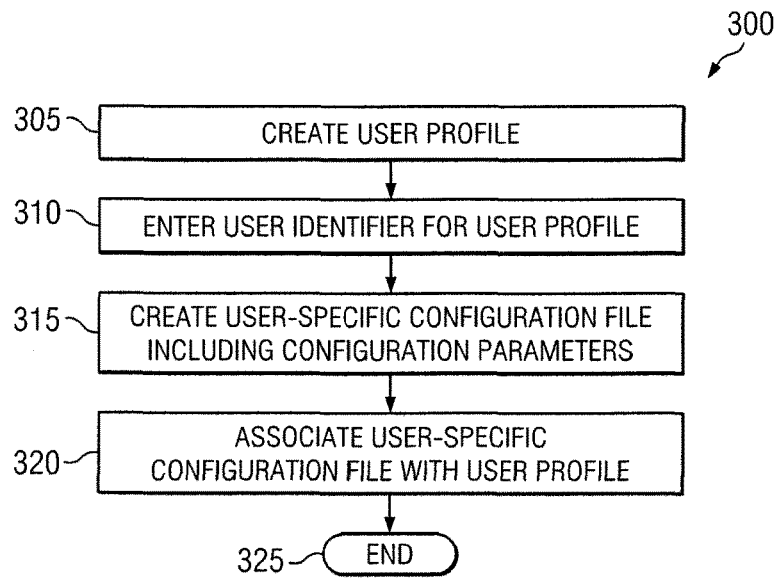
FIG. 3 is an embodiment of a procedure for creating a user profile for provisioning a communication device.

FIG. 3 is an embodiment of a procedure 300 for creating a user profile for provisioning a communication device. In step 305, an operator of the feature server 130 creates a user profile to be associated with a particular user of the first communication device 105. In at least one embodiment, the operator creates the user's profile by first logging onto a portal provided for accessing set-up and configuration functions of the feature server 130. In a particular embodiment, the portal is a web portal. In step 310, the operator enters a user identifier for the user's profile. The user identifier identifies the particular user of the first communication device 105. Examples of user identifiers that may be used in various embodiments, include a user name, an email address, an employee ID number, a social security number, and a phone number associated with the user. In step 315, the operator creates a user-specific configuration file for the first communication device 105. The user-specific configuration file includes configuration parameters used to configure the first communication device 105 for operation. For example, the configuration parameters may include parameters related to the calling features and/or services authorized for the first communication device 105, a company logo to be displayed on a display screen of the first communication device 105, phone lines that are activated for use by the first communication device 105. Examples of call features include call forwarding and 911 services that may be used with the first communication device 105.

In step 320, the user-specific configuration file is associated with the user profile. The user profile is then stored in the user profile storage 205 for subsequent download to the first communication device 105 during a provisioning procedure. In at least one embodiment, the first communication device 105 is preconfigured with a default configuration file within the configuration file storage 110. The default configuration file is not specific to a particular user. In various embodiments, the first communication device 105 is drop shipped to a customer premise location and a user is instructed to couple the first communication device 105 to a power source and network connection. Upon coupling the first communication device 105 to a power source and a network connection, the first communication device 105 retrieves an address associated with the feature server 130 from the default configuration file and sends a registration request to the feature server 130 with a destination address equal to the address associated with the feature server 130. In a particular embodiment, the address associated with the feature server 130 is an IP address. In various embodiments, the feature server 130 is configured to send the user-specific configuration file to the first communication device 105 in response to receiving the registration request. In some embodiments, the feature server 130 is further configured to provision the first communication device 105 at the feature server 130.

Figure 4:
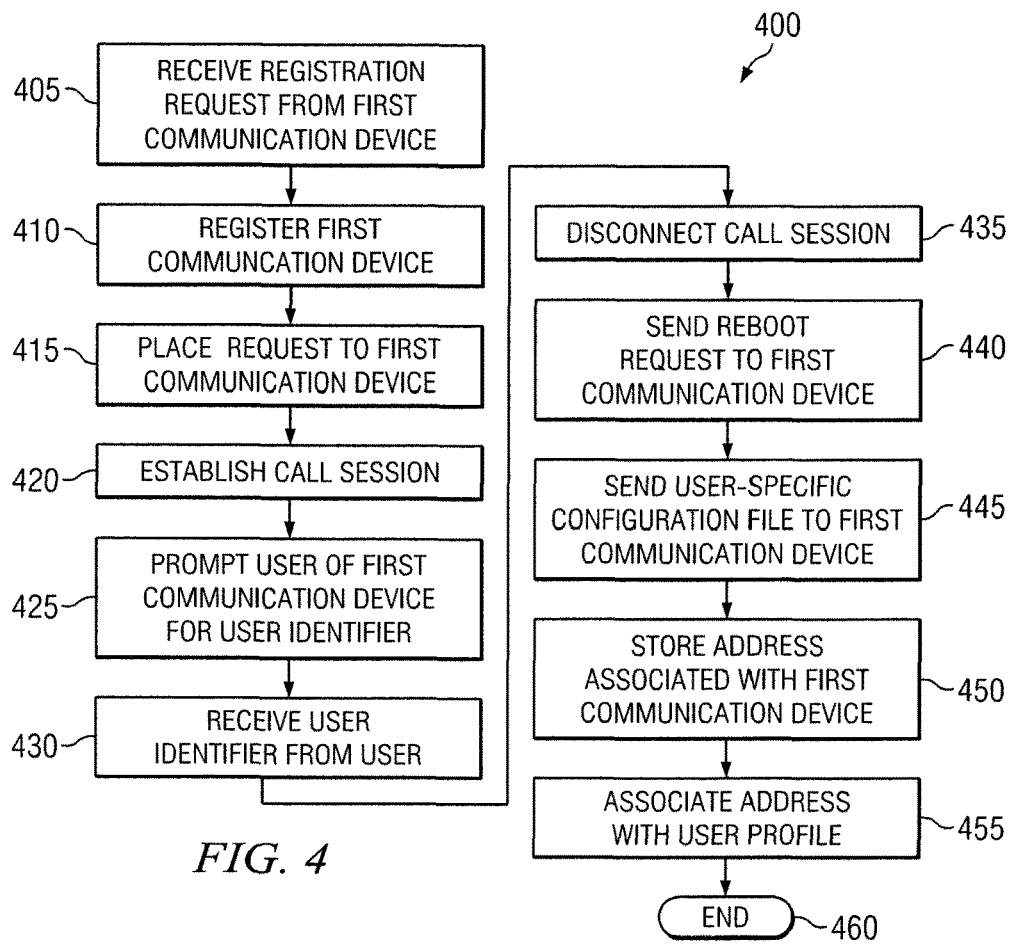
FIG. 4 is an embodiment of a procedure for user-initiated provisioning the first communication device by the feature server.

FIG. 4 is an embodiment of a procedure 400 for provisioning the first communication device 105 by the feature server 130. In step 405, the feature server 130 receives the registration request from the first communication device 105. The registration request includes an address associated with the first communication device 105. In a particular embodiment, the address associated with the first communication device 105 is a MAC address of the first communication device 105. In step 410, the feature server 130 registers the first communication device 105 at the feature server 130. After the first communication device 105 has been registered by the feature server 130, the feature server 130 places a call request to the first communication device 105. When a user of the first communication device 105 answers the call request from the feature server 130, a call session is established between a first communication device 105 and the feature server 130 in step 420. In step 425, the feature server 130 prompts the user of the first communication device 105 to provide a user identifier associated with the user. In a particular embodiment, the IVR module 215 of the feature server 130 provides an audible prompt to the user to provide the user identifier by speaking the user identifier into a microphone or handset of the first communication device 105. In still other embodiments, the feature server 130 may prompt the user of the first communication device 105 to enter the user identifier using a keypad or other tactile input device of the first communication device 105. In various embodiments, the user identifier may include a user name, an email address, an employee ID number, a social security number, or a phone number associated with the particular user. In step 430, the feature server 130 receives the user identifier from the user of the first communication device 105.

In step 435, the call session between the first communication device 105 and the feature server 130 is disconnected. In a particular embodiment, the IVR module 215 of the feature server 130 prompts the user of the first communication device 105 to hang up in order to disconnect the call session. After disconnection of the call session, the feature server 130 sends a reboot request to the first communication device 105 in step 440. The reboot request instructs the first communication device 105 to reboot and/or restart. In step 445, the feature server 130 matches the user identifier to an associated user profile stored in the user profile storage 205 and sends a user-specific configuration file associated with the user profile to the first communication device 105. In various embodiments, the user-specific configuration file is used by the first communication device 105 to configure the user communication device 105 for operation with the feature server 130, as well as with the authorized features provided for the first communication device 105 by the feature server 130.

In step 450, the address associated with the first communication device is stored by the feature server 130. In a particular embodiment, the feature server 130 stores the address in a provisioning table of the processing module 220. In a particular embodiment, the address is a MAC address of the first communication device 105 and is populated in a provisioning table of the feature server 130. In step 455, the address associated with the first communication device 105 is associated with the user profile. Accordingly, the user profile, the address associated with the first communication device 105, and the user-specific configuration file are associated together and stored within the user profile storage 205 of the feature server 130.

After configuration and provisioning of the first communication device 105 by the feature server 130, the first communication device 105 is configured to operate with the feature server 130 and network(s) 125 and features provided by the feature server 130 and placing and receiving calls with other communication devices coupled to the network(s) 125, such as the second communication device 135. In step 460, the procedure 400 ends.

Figure 5:
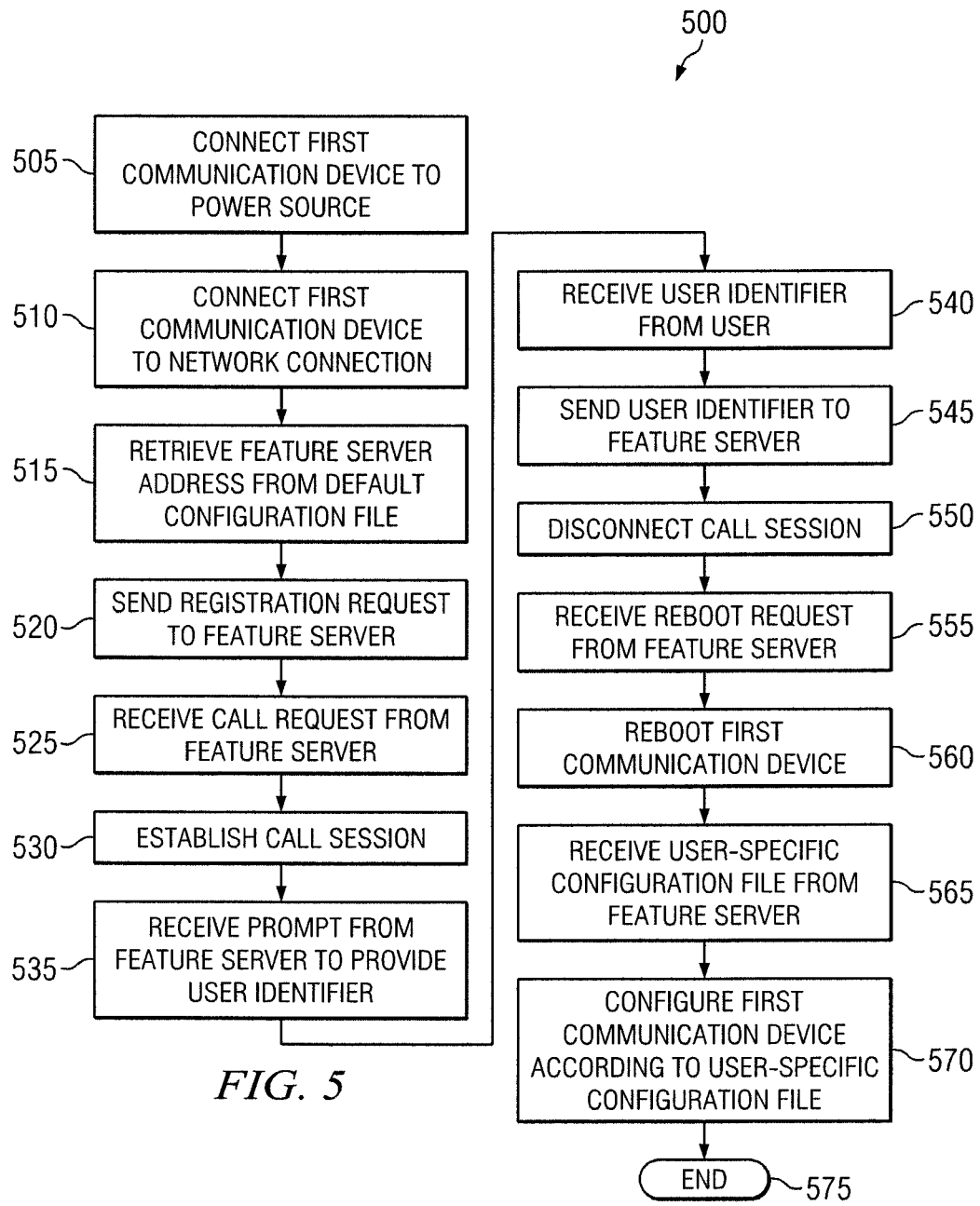
FIG. 5 is another embodiment of a procedure for user-initiated provisioning of the first communication device.

FIG. 5 is another embodiment of a procedure 500 for user-initiated provisioning of the first communication device 105. In various embodiments, a user profile is created for a particular user of the first communication device 105, such as described with respect to FIG. 3. A user identifier associated with the user profile is created. Further, a user-specific configuration file including one or more configuration parameters is created and associated with the user identifier. The user profile and associated information is then stored in the user profile storage 205 of the feature server 130. In a particular embodiment, the user profile is created by an operator of the feature server 130. In various embodiments, the feature server 130 is provided by a service provider. Prior to shipping the first communication device 105 to an end user, the first communication device 105 is provided with a default or base configuration file that is stored in the configuration files storage 110. The default configuration file includes an address associated with the feature server 130. In a particular embodiment, the address associated with the feature server is an IP address. In at least one embodiment, the first communication device 105 is shipped to an end user at the customer premises. In still other embodiments, a user may obtain the first communication device 105 from a retailer. In at least one embodiment, the first communication device 105 may be shipped with a quick start guide containing instructions instructing the user to connect the first communication device to a power source, such as a power outlet.

In step 505, the user connects the first communication device to a power source. In at least one embodiment, the user connects the first communication device 105 to a power source by plugging a power cord of the first communication device into a power outlet. In another embodiment, the user may connect the first communication device to a power source by installing batteries within the first communication device 105. In step 510, the user connects the first communication device 105 to a network connection. The network connection places the first communication device 105 in communication with the network(s) 125. In at least one embodiment, the network connection is an internet connection. In step 515, the first communication device 105 retrieves the feature server address from the default configuration file in response to connecting the first communication device 105 to the network connection. In at least one embodiment, the feature server address is an IP address associated with the feature server. In still other embodiments, the first communication device 105 may be connected to the internet connection prior to being connected to the power source. In still other embodiments, the network connection is a wireless connection that is established with the network(s) 125 after the first communication device 105 is powered-on.

In step 520, the first communication device 105 sends a registration request to the feature server at the feature server address retrieved from the default configuration file. The registration request includes an address associated with the first communication device 105 that is stored in a memory 120 of the first communication device 105. In a particular embodiment, the address associated with the first communication 105 is a MAC address. The registration request is received by the feature server 130, and the feature server 130 registers the first communication device 105 in response to receiving the registration request. The feature server 130 then sends a call request to the first communication device 105. In step 525, the first communication device 105 receives the call request from the feature server 130. In step 530, the user of the first communication device 105 answers the call request and a call session is established between the first communication device 105 and the feature server 130. In step 535, the first communication device 105 receives a prompt from the feature server 130 prompting a user of the first communication device 105 to provide a user identifier. In at least one embodiment, the prompt from the feature server may include an audio prompt instructing the user to provide a user identifier. In still other embodiments, the prompt from the feature server 130 may include a text prompt that is displayed on a display of the first communication device 105 instructing the user to provide a user identifier.

In step 540, the first communication device 105 receives the user identifier from the user. In at least one embodiment, the user provides the user identifier to the first communication device by speaking the user identifier into a microphone or handset of the first communication device 105. In other embodiments, the user provides the user identifier to the first communication device 105 by typing the user identifier on a keypad or other tactile input device of the first communication device 105. In step 545, the first communication device 105 sends the user identifier to the feature server 130. In step 550, the call session is disconnected. In a particular embodiment, the feature server 130 may prompt the user of the first communication device 105 by either voice or text to hang up the connection in order to disconnect the call session. In step 555, the first communication device 105 receives a reboot request from the feature server 130. In response to receiving the reboot request, the first communication device 105 reboots and/or restarts. In step 565, the first communication device 105 receives a user-specific configuration file associated with the user identifier from the feature server 130. In a particular embodiment, the user-specific configuration file is stored within the configuration file storage 110 of the first communication device 105. In some embodiments, the default configuration file and the user-specific configuration file are both stored within the configuration file storage 110. In still other embodiments, the user-specific configuration file may replace the default configuration file within the configuration file storage 110.

In step 570, the first communication device 105 is configured according to one or more configuration parameters within the user-specific configuration file. Once the first communication device 105 is configured according to the user-specific configuration file, the first communication device 105 may use call features provided by the feature server 130, as well as communicate with other communication devices in communication with the network(s) 125. For example, the first communication device 105 may place or receive a call to the second communication device 130, and establish a communication session between the first communication device 105 and the second communication device 130. In a particular embodiment, the established communication session between the first communication device 105 and the second communication device 135 is a voice call session. In step 575, the procedure 500 ends.

In alternative embodiments, the user of the first communication device 105 is prompted to enter the user identifier when the first communication device 105 is turned on for the first time by the user. In particular embodiments, the prompt includes one or more of a text prompt or a voice prompt. The user identifier is then communicated automatically to the feature server 130, and the feature server 130 registers the first communication device 105 in response to receiving the user identifier. In at least one embodiment, the user identifier is to sent to the feature server 130 as part of a registration request. At the same time as or immediately after the feature server 130 registers the first communication device 105, the feature server 130 automatically sends the user-specific configuration file to the first communication device 105. In response to receiving the user-specific configuration file, the first communication device 105 is configured according to one or more configuration parameters within the user-specific configuration file. Once the first communication device 105 is configured according to the user-specific configuration file, the first communication device 105 may use call features provided by the feature server 130, as well as communicate with other communication devices in communication with the network(s) 125.

In various embodiments, user initiated provisioning of communication devices, such as IP phones, eliminates the need to send a truck roll or a technician to a customer's premises. In some embodiments, the use of the IVR module 215 allows for a user to self-provision a communication device via voice while requiring little to no technical knowledge or expertise by the end user.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A method for provisioning of a Voice over Internet Protocol (VoIP) telephone comprising:
creating a user identifier associated with a user of the VoIP telephone;

creating a user-specific configuration file, the user-specific configuration file including one or more configuration parameters associated with the user identifier;
associating the user-specific configuration file with the user identifier;
receiving the user identifier from the user of the VoIP telephone, wherein the user identifier associates the VoIP telephone with the user;
sending a reboot request to the VoIP telephone associated with the user; and
after the VoIP telephone associated with the user reboots, sending the user-specific configuration file associated with the user identifier to the VoIP telephone associated with the user, the one or more configuration parameters of the user-specific configuration file operable to configure the VoIP telephone with one or more authorized features which the user is authorized to use,
wherein the one or more configuration parameters include user-specific parameters associated with configuring the VoIP telephone that the user associated with the user identifier is authorized to use,
wherein the one or more authorized features that are configured based on the one or more configuration parameters of the user-specific parameters comprise call-related features comprising at least one of selective call forwarding, selective call acceptance, selective call rejection, call blocking, or 911 services.

2. The method of claim 1, further comprising:
receiving a registration request from the VoIP telephone, the registration request including an address associated with the VoIP telephone;
registering the VoIP telephone in response to receiving the registration request;
placing a call request to the VoIP telephone;
establishing a call session with the VoIP telephone; and
prompting the user of the VoIP telephone for the user identifier.

3. The method of claim 2, further comprising:
storing the address associated with the VoIP telephone in a user profile associated with the user identifier.

4. The method of claim 1, wherein receiving the user identifier from the VoIP telephone includes receiving a voice input from the VoIP telephone, the voice input including the user identifier.

5. The method of claim 1, further comprising:
disconnecting the call session with the VoIP telephone prior to sending the one or more configuration parameters associated with the user identifier to the VoIP telephone.

6. An apparatus for provisioning of a Voice over Internet Protocol (VoIP) telephone comprising:
a memory; and
at least one processor, the at least one processor configured to retrieve computer readable instructions from the memory and execute the computer readable instruction so as to:
create a user identifier associated with a user of the VoIP telephone;
create a user-specific configuration file, the user-specific configuration file including one or more configuration parameters associated with the user identifier;
associate the user-specific configuration file with the user identifier;
receive the user identifier from the VoIP telephone, wherein the user identifier associates the VoIP telephone with a user;
send a reboot request to the VoIP telephone, associated with the user; and
after the VoIP telephone reboots, send the user-specific configuration file associated with the user identifier to the VoIP telephone associated with the user, the one or more configuration parameters of the user-specific configuration file operable to configure the VoIP telephone with one or more authorized features which the user is authorized to use,
wherein the one or more configuration parameters include user-specific parameters associated with configuring the VoIP telephone that the user associated with the user identifier is authorized to use,
wherein the one or more authorized features that are configured based on the one or more configuration parameters of the user-specific parameters comprise call-related features comprising at least one of selective call forwarding, selective call acceptance, selective call rejection, call blocking, or 911 services.

7. The apparatus of claim 6, wherein the at least one processor is further configured to:
place a call request to the VoIP telephone;
establish a call session with the VoIP telephone; and
prompt the user of the VoIP telephone for the user identifier.

8. The apparatus of claim 7, wherein the at least one processor is further configured to:
disconnect the call session with the VoIP telephone prior to sending the one or more configuration parameters associated with the user identifier to the VoIP telephone.

9. The apparatus of claim 6, wherein the at least one processor is further configured to:
receive a registration request from a VoIP telephone, the registration request including an address associated with the VoIP telephone; and
register the VoIP telephone in response to receiving the registration request.

10. The apparatus of claim 9, wherein the at least one processor is further configured to:
store the address associated with the VoIP telephone in a user profile associated with the user identifier.

11. The apparatus of claim 6, wherein receiving the user identifier from the VoIP telephone includes receiving a voice input from the VoIP telephone, the voice input including the user identifier.

12. A method for user-initiated provisioning of a Voice over Internet Protocol (VoIP) telephone comprising:
sending a user identifier to the feature server, wherein the user identifier associates the VoIP telephone with the user;
receiving a reboot request from the feature server;
performing a reboot; and
after performing a reboot, receiving a user-specific configuration file associated with the user identifier, the user-specific configuration file including one or more configuration parameters associated with the user identifier, the one or more configuration parameters operable to configure the VoIP telephone associated with the user,
wherein the one or more configuration parameters include user-specific parameters associated with configuring the VoIP telephone that the user associated with the user identifier is authorized to use; and
configuring the VoIP telephone, associated with the user, with one or more authorized features which the user is authorized to use, according to the one or more configuration parameters, wherein the one or more authorized features that are configured based on the one or more configuration parameters of the user-specific parameters comprise call-related features comprising at least one of selective call forwarding, selective call acceptance, selective call rejection, call blocking, or 911 services.

13. The method of claim 12, further comprising:
receiving the user identifier from the user.

14. The method of claim 13, wherein receiving the user identifier from the user comprises receiving a voice input from the user.

15. The method of claim 12 further comprising:
sending a registration request to a feature server, the registration request including an address associated with a VoIP telephone;
receiving a call request from the feature server in response to sending the registration request;
establishing a call session with the feature server; and
receiving a prompt from the feature server for a user to provide a user identifier.

16. The method of claim 15, wherein the sending of the registration request is performed in response to connecting the VoIP telephone to a network connection.

* * * * *